United States Patent
Heederik et al.

(10) Patent No.: US 10,066,132 B2
(45) Date of Patent: Sep. 4, 2018

(54) OPAQUE ADHESIVES IN WET CONDITION FOR LABEL APPLICATION

(71) Applicant: Avery Dennison Corporation, Glendale, CA (US)

(72) Inventors: Peter J. Heederik, Hillegom (NL); Santosh L. Hire, Maharashtra (IN); Darren B. Milligan, Victoria (AU)

(73) Assignee: Avery Dennison Corporation, Glendale, CA (US)

( * ) Notice: Subject to any disclaimer, the term of this patent is extended or adjusted under 35 U.S.C. 154(b) by 8 days.

(21) Appl. No.: 15/142,030

(22) Filed: Apr. 29, 2016

(65) Prior Publication Data
US 2016/0319168 A1   Nov. 3, 2016

(30) Foreign Application Priority Data
Apr. 30, 2015 (IN) .......................... 1726/MUM/2015

(51) Int. Cl.
*C09J 133/02* (2006.01)
*G09F 3/02* (2006.01)
(Continued)

(52) U.S. Cl.
CPC .............. *C09J 133/02* (2013.01); *B32B 7/06* (2013.01); *B32B 7/12* (2013.01); *B32B 15/04* (2013.01);
(Continued)

(58) Field of Classification Search
CPC . G09F 3/02; G09F 3/0292; G09F 3/10; G09F 2003/0257; G09F 2003/0241; C09J 133/02; C09J 7/0275; C09J 7/026; C09J 7/02; C09J 7/0292; C09J 7/0296; C09J 7/045; C09J 11/04; C09J 2433/00; C09J 2423/006; C09J 2400/16; C09J 2400/143; C09J 2203/334; C09J 2255/10; C09J 2203/12; C09J 2203/26; C09J 2307/41; C09J 2203/412; C09J 2203/7265;
(Continued)

(56) References Cited

U.S. PATENT DOCUMENTS 5,925,456 A  7/1999 Malek
5,955,166 A  9/1999 Murphy
(Continued)

FOREIGN PATENT DOCUMENTS

CN  202534269  11/2012
CN  203545931  4/2014
(Continued)

OTHER PUBLICATIONS

Invitation to Pay Additional Fees dated Aug. 16, 2016 issued in corresponding IA No. PCT/US2016/029963 filed Apr. 29, 2016.
(Continued)

*Primary Examiner* — Patricia L. Nordmeyer
(74) *Attorney, Agent, or Firm* — Avery Dennison Corporation

(57) ABSTRACT

Various opacifying adhesive compositions are described. The adhesives exhibit relatively high levels of opacity in wet conditions while maintaining acceptable adhesive properties. Also described are label assemblies and labeled containers using such adhesives. Related methods of use and preparation are also described.

20 Claims, 3 Drawing Sheets

(51) Int. Cl.
*G09F 3/10* (2006.01)
*C09J 11/04* (2006.01)
*B32B 7/06* (2006.01)
*B32B 7/12* (2006.01)
*B32B 15/04* (2006.01)
*B32B 15/08* (2006.01)
*B32B 15/12* (2006.01)
*B32B 27/08* (2006.01)
*B32B 27/10* (2006.01)
*B32B 27/32* (2006.01)
*B32B 29/00* (2006.01)
*C09J 7/20* (2018.01)
*C09J 7/38* (2018.01)
*C09J 7/22* (2018.01)
*C09J 7/24* (2018.01)
*C09J 7/28* (2018.01)
*C09J 7/29* (2018.01)
*C09J 7/21* (2018.01)

(52) U.S. Cl.
CPC ............. *B32B 15/08* (2013.01); *B32B 15/12* (2013.01); *B32B 27/08* (2013.01); *B32B 27/10* (2013.01); *B32B 27/32* (2013.01); *B32B 29/002* (2013.01); *C09J 7/20* (2018.01); *C09J 7/21* (2018.01); *C09J 7/22* (2018.01); *C09J 7/243* (2018.01); *C09J 7/28* (2018.01); *C09J 7/29* (2018.01); *C09J 7/38* (2018.01); *C09J 11/04* (2013.01); *G09F 3/02* (2013.01); *B32B 2255/10* (2013.01); *B32B 2255/12* (2013.01); *B32B 2255/26* (2013.01); *B32B 2307/41* (2013.01); *B32B 2307/412* (2013.01); *B32B 2307/7265* (2013.01); *B32B 2307/748* (2013.01); *B32B 2519/00* (2013.01); *C09J 2203/334* (2013.01); *C09J 2400/143* (2013.01); *C09J 2400/16* (2013.01); *C09J 2423/006* (2013.01); *C09J 2433/00* (2013.01); *G09F 3/10* (2013.01); *G09F 2003/0241* (2013.01); *G09F 2003/0257* (2013.01)

(58) Field of Classification Search
CPC .. B32B 7/06; B32B 7/12; B32B 15/04; B32B 15/08; B32B 15/12; B32B 27/08; B32B 27/10; B32B 27/32; B32B 29/002; B32B 2255/10; B32B 2255/12; B32B 2255/26; B32B 2307/41; B32B 2307/412; B32B 2307/7265; B32B 2307/748; B32B 2519/00
See application file for complete search history.

(56) References Cited

U.S. PATENT DOCUMENTS

| | | | |
|---|---|---|---|
| 5,962,075 | A | 10/1999 | Sartor et al. |
| 6,016,618 | A | 1/2000 | Attia et al. |
| 6,096,397 | A | 8/2000 | Murphy |
| 6,224,974 | B1 | 5/2001 | Wuu |
| 6,235,344 | B1* | 5/2001 | Whiteman ............... C09J 7/045 427/180 |
| 6,576,325 | B1 | 6/2003 | Yamanaka et al. |
| 9,169,422 | B2* | 10/2015 | O'Hare ................. C09J 133/14 |
| 9,188,889 | B2 | 11/2015 | Koger et al. |
| 2009/0068389 | A1 | 3/2009 | Maule et al. |
| 2012/0088051 | A1* | 4/2012 | Holbert .................... B32B 7/06 428/41.3 |
| 2013/0292031 | A1 | 11/2013 | Cooper et al. |
| 2015/0367666 | A1 | 12/2015 | Fu et al. |
| 2016/0018748 | A1 | 1/2016 | Koger et al. |

FOREIGN PATENT DOCUMENTS

| | | |
|---|---|---|
| CN | 104992620 | 10/2015 |
| CN | 105176431 | 12/2015 |
| CN | 204874381 | 12/2015 |
| CN | 104861889 | 9/2017 |
| EP | 1026216 | 8/2000 |
| IN | 214389 | 2/2007 |
| IN | 269567 | 6/2012 |
| WO | 91/16025 | 10/1991 |
| WO | 01/32796 | 5/2001 |
| WO | 2004/060647 | 7/2004 |
| WO | 2004/061037 | 7/2004 |
| WO | 2004/090845 | 10/2004 |
| WO | 2006/061246 | 6/2006 |
| WO | 2008/042398 | 4/2008 |
| WO | 2008/065263 | 6/2008 |
| WO | 2009/042371 | 4/2009 |
| WO | 2010/074865 | 7/2010 |
| WO | 2011/112170 | 9/2011 |
| WO | 2011/112171 | 9/2011 |
| WO | 2013/169542 | 11/2013 |
| WO | 2014/095795 | 6/2014 |
| WO | 2014/095796 | 6/2014 |
| WO | 2014/100120 | 6/2014 |

OTHER PUBLICATIONS

International Search Report and Written Opinion dated Oct. 28, 2016 issued in corresponding IA No. PCT/US2016/029963 filed Apr. 29 2016.

International Preliminary Report on Patentability dated Nov. 9, 2017 issued in corresponding IA No. PCT/US2016/029963 filed Apr. 29, 2016.

* cited by examiner

OPAQUE ADHESIVES IN WET CONDITION FOR LABEL APPLICATION

CROSS REFERENCES TO RELATED APPLICATIONS

The present application claims the benefit of Indian Provisional Application No. 1726/MUM/2015 filed on Apr. 30, 2015, which is incorporated herein by reference in its entirety.

FIELD

The present subject matter relates to adhesive compositions that remain opaque in wet condition and may be used for pressure sensitive applications including but not limited to label constructions, and graphic and reflective constructions. The present subject matter also relates to methods of preparation of the adhesives and construction of the labels. The present subject matter additionally relates to labeled articles using the adhesives. The labels are particularly useful for application in wine and beverages wherein the label does not lose its opacity when the label along with its accompanying container is subjected to moisture, water or humidity for cooling.

BACKGROUND

A label is often the primary resource for evaluating wine or beverages before making a purchase. Moreover, wineries place great importance on label design as appearance of label is known to influence wine buying choices. A majority of wine and beverage bottles use paper as label facestock because of its perceived superior aesthetic appearance and shelf appeal. Paper facestocks are however, susceptible to losing opacity when exposed to moisture, humidity and water during cooling or storing. During the period of cooling, liquid infuses into such facestocks and causes the appearance of the paper to change unacceptably. Additionally, the facestock might pucker, further reducing appearance.

It is also observed in certain cases that irrespective of the nature of the facestock being used in the label, moisture and related components can adversely affect the adhesive holding the label to the bottle and the label may become detached which causes identification even more difficult.

Attempts have been made or solutions have been proposed in the past to provide or improve general opacity of labels. These attempts, however either failed to recognize the opacity problem of labels in wet conditions, and were ineffective or expensive or both.

In addition to the past attempts to devise a solution to improve opacity in labels, the conventional art provides general solutions to dry opacity. The solutions include addition of pigments, such as titanium dioxide, calcium carbonate, aluminium silicate, calcined clay, kaolin clay, and zinc oxide. The pigments can be added to the paper facestock layer during the paper making process. The pigments can also be added as a coating layer such as an undercoat or topcoat on the paper facestock and the coat can be placed between the facestock and a pressure sensitive adhesive layer.

A significant limitation with those pigments is that many of those pigments such as calcium carbonate, aluminium silicate, calcined clay, kaolin clay, and zinc oxide show good dry opacity but exhibit poor wet opacity. Titanium dioxide even though showing better wet opacity, cannot be used in the suggested way because titanium dioxide is significantly expensive. Also manufacturers of labels do not have control on paper manufacturing so as to be able to incorporate desired levels of pigment into the paper. Moreover, use of pigments in coating layers involves multiple steps that are often complex requiring special processing requirement and thus adding further to cost of manufacturing. Thus utilization of the pigments, while attractive, has not been general.

Accordingly, a need exists for a new strategy for labelling articles so that the labels maintain a relatively high level of opacity when in a wet condition, while also maintaining adhesive properties.

SUMMARY

The difficulties and drawbacks associated with previous approaches are addressed in the present subject matter as follows.

In view of the foregoing, a pressure sensitive construction adapted to remain opaque in wet conditions is provided. The pressure sensitive construction includes an outer layer of facestock for receiving printed indicia, at least one opacifying adhesive layer underlying the facestock, and a liner underlying the opacifying adhesive layer. The opacifying adhesive layer includes an adhesive component and a pigment component in proportion sufficient to maintain opacity when exposed to an aqueous environment for at least 1 hour while maintaining peel adhesion and loop tack of the opacifying adhesive layer when applied to a substrate.

The label laminate may further include an adhesive layer underlying the opacifying adhesive layer. The adhesive layer may be selected from the group including emulsion adhesives, hot-melt adhesives, solvent adhesives and/or a combination thereof.

In another aspect of the subject matter, a label or laminate adapted to remain opaque in wet condition for pressure sensitive application is provided. The laminate may include an outer layer of facestock for receiving printed indicia, a first opacifying adhesive layer and a second opacifying adhesive layer. The first opacifying adhesive layer underlies the facestock. The second opacifying adhesive layer may underlie the first opacifying adhesive layer. The first opacifying adhesive layer may include a first adhesive component and a first pigment component in a proportion sufficient to maintain opacity when exposed to an aqueous environment for at least 1 hour with sufficient peel adhesion and loop tack of the first opacifying adhesive layer in the pressure sensitive application. The second opacifying adhesive layer may include a second adhesive component and a second pigment component in a proportion sufficient to maintain opacity when exposed to an aqueous environment for at least 1 hour with sufficient peel adhesion or loop tack of the second opacifying adhesive layer in the pressure sensitive application. The laminate may additionally include a liner underlying the second opacifying adhesive layer.

In yet another aspect of the subject matter, an opacifying adhesive composition adapted to remain opaque in wet condition for pressure sensitive label application is provided. The opacifying adhesive may include a proportionate amount of adhesive component and a pigment component sufficient to maintain opacity when exposed to an aqueous environment for at least 1 hour with sufficient peel adhesion and loop tack in the pressure sensitive application.

In a further aspect of the subject matter, a method of preparation of an opacifying adhesive composition which is adapted to remain opaque in wet condition for pressure sensitive label application is provided. The method may include the steps of mixing a proportionate amount of an adhesive component and a pigment component with constant agitation, and continuing the mixing for a desired time period such as for example about 20 minutes. The opacifying adhesive does not cause any unacceptable loss of peel adhesion or tack of the adhesive component in pressure sensitive application.

In still another aspect of the present subject matter, a labeled article is provided in which the label maintains a relatively high degree of opacity in a wet condition while also exhibiting sufficient peel adhesion and loop tack. The label is adhered to the article by a layer of an opacifying adhesive that includes a proportionate amount of adhesive component and a pigment component.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
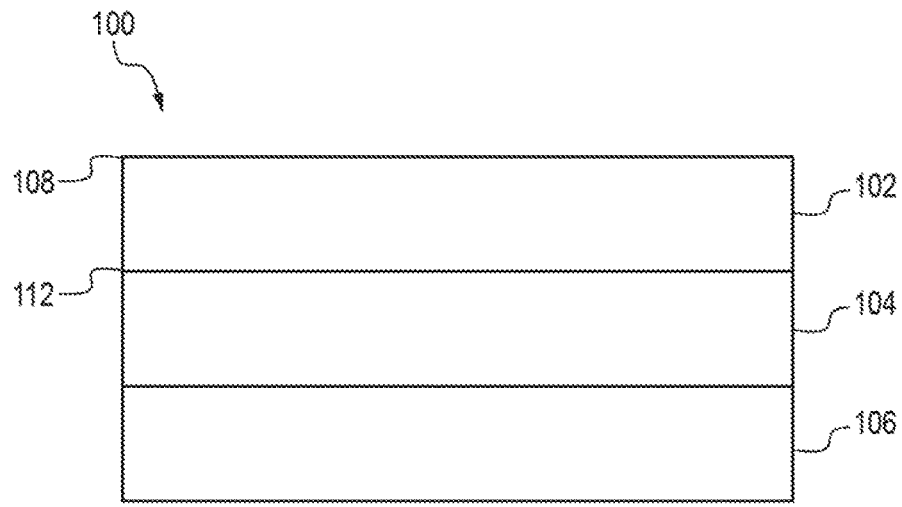
FIG. 1 is an illustrative embodiment of a cross-sectional view of a label having an opacifying adhesive layer in accordance with the present subject matter.

The present subject matter is not limited to the particular embodiments described herein, and may vary. It is also to be understood that the terminology used herein is for the purpose of describing particular embodiments only, and is not intended to be limiting. Where a range of values is provided, it is understood that each intervening value, to the tenth of the unit of the lower limit unless the context clearly dictates otherwise, between the upper and lower limit of that range and any other stated or intervening value in that stated range is encompassed within the subject matter. The upper and lower limits of these smaller ranges may independently be included in the smaller ranges is also encompassed within the subject matter, subject to any specifically excluded limit in the stated range. Where the stated range includes one or both of the limits, ranges excluding either or both of those included limits are also included in the subject matter.

Unless defined otherwise, all technical and scientific terms used herein have the same meaning as commonly understood by one of ordinary skill in the art to which this subject matter belongs. Although any methods and materials similar or equivalent to those described herein can also be used in the practice or testing of the present subject matter, a limited number of the exemplary methods and materials are described herein.

It must be noted that as used herein and in the appended claims, the singular forms "a", "an", and "the" include plural referents unless the context clearly dictates otherwise.

The embodiments of the present subject matter will be better understood in terms of their components, structure and effectiveness from the following detailed description with reference to the figures and data depicting various results. Various objects, features, aspects, and advantages of the present subject matter will become more apparent from the following detailed description of various embodiments of the subject matter along with accompanying drawings.

The embodiments of this subject matter result from the unexpected discovery that when a particular adhesive is proportionally mixed with one or more suitable opacifying components such as pigments, an opacifying adhesive results which can be used in a pressure sensitive adhesive application that maintains opacity in wet condition without compromising required adhesive properties.

It is typically understood by those having ordinary skill in the art that mixing pigments with adhesive is undesirable as addition of pigment is known to reduce adhesive strength and tack of adhesive. Specifically, it is reported that an addition of 20% $TiO_2$ in pressure sensitive adhesive (PSA) reduces tack by more than 50% and peel by 50%. See Donatas Satas, *Handbook of Pressure Sensitive Adhesive Technology*, Third Edition, Warwick, Satas & Associates, 1999, Chapter-19, Table 19-5, The Effect of Various Fillers.

Pressure sensitive adhesives (PSA's) are typically characterized by the ability of the adhesive to withstand creep or shear deformation, while exhibiting adequate tack and peel adhesion properties. This balance of properties is derived from the structure of the main polymer bulk which makes up the PSA. It is characterized by a high molecular weight, which provides the necessary cohesive strength and resistance to shear deformation, and by a low modulus of the polymer backbone, which allows the polymer to conform to a substrate surface upon contact. It is also important that PSA's should perform in wide range of substrates to which the adhesive may be attached and such substrates include glass, plastics such as high density polyethylene (HDPE), wood, metal and the like. Accordingly, any adverse effect on adhesive property such as peel adhesion and tack typically results from mixing of additive into the adhesive, and significantly limits applicability of the adhesive in pressure sensitive constructions, particularly for label applications which are intended to withstand wet environments.

An embodiment of a pressure sensitive construction of a label laminate is shown in FIG. 1. The label of laminate 100 is adapted to remain opaque in wet condition/environment. The laminate 100 includes an outer layer of facestock 102, an opacifying adhesive layer 104 and a liner 106. The face stock 102 has a first surface 108 and a second surface 112. The first surface 108 of the face stock is meant to receive indicia such as printed indicia or other text or symbols. The opacifying adhesive layer 104 underlies the second surface 112 of the face stock 102. The liner 106 underlies the opacifying adhesive layer 104.

The opacifying adhesive layer includes an adhesive component and a pigment component in a proportion sufficient to cause/maintain opacity when wet, while maintaining peel adhesion and loop tack of the adhesive component in pressure sensitive applications. That is, there is no unacceptable loss in peel adhesion and/or loop tack. The opacity of the label in wet condition may be in range of from about 70% to about 100% in many embodiments, from about 75% to about 95% in certain embodiments and from about 80% to about 90% in particular embodiments. All opacity values noted herein are overall opacity values taken across a thickness of a label assembly as described herein, unless noted otherwise. Opacity is measured as described herein in the description of various examples of the present subject matter.

The expression "while maintaining peel adhesion and tack of the adhesive component" as used herein refers to a comparison of such properties of an adhesive without any pigment (fillers) and an adhesive with pigments.

The term "no unacceptable loss of peel adhesion" refers to a loss in peel adhesion of less than 90%, in many embodiments less than 80%, less than 70%, less than 60%, less than 50%, less than 40%, less than 30%, less than 20%, less than 10%, and in certain embodiments less than 5% when the pigment is added compared to the nonpigmented adhesive under dry conditions.

The term "no unacceptable loss of loop tack" refers to a loss in loop tack of less than 90%, in many embodiments less than 80%, less than 70%, less than 60%, less than 50%, less than 40%, less than 30%, less than 20%, less than 10%, and in certain embodiments less than 5% when the pigment is added compared to the nonpigmented adhesive under dry conditions.

The adhesive component may be a pressure sensitive adhesive and the pressure sensitive adhesive component may be selected from the group consisting of emulsion adhesives, hot-melt adhesives, solvent adhesives, and/or combinations thereof.

Various commercially available adhesive formulations can be used as the adhesive component of the opacifying adhesives of the present subject matter. Nonlimiting examples of such adhesive formulations include but are not limited to S2000N, S692N, AT20N all available from Avery Dennison; H9232 available from BASF; and XPE1045 available from Avery Dennison. It will be appreciated that the present subject matter is not limited to any particular adhesive component, and includes a wide array of such components.

The pigment component in the opacifying adhesive layer can be selected such that the pigment exhibits acceptable wet opacity when present along with the noted adhesive component. The pigment component may be present in a weight range of about 10% to about 50% of the adhesive component in many embodiments, in a range of about 15% to about 45% in certain embodiments, and from about 20% to about 40% in particular embodiments. In many embodiments the pigment may include titanium dioxide $TiO_2$. Various commercially available $TiO_2$ formulations and materials can be used as the pigment component in the opacifying adhesives of the present subject matter. The pigment may utilize other pigments instead of, or in addition to, titanium dioxide such as structured calcium carbonates (PCCs), barium sulphate, calcined clay, and aluminium silicates.

In certain embodiments, the opacifying adhesives of the present subject matter utilize coated or surface treated $TiO_2$ in the pigment component. In particular applications, the surface coated $TiO_2$ maintains a relatively high dispersal level within the opacifying adhesive in addition to exhibiting other benefits and/or advantages.

The pressure sensitive construction may further comprise an adhesive layer underlying the opacifying adhesive layer which is detailed hereinafter in reference to FIG. 2.

The pressure sensitive application may be performed on nearly any substrate that may include but not limited to glass, plastic, metal substrate, high density polyethylene (HDPE), wood, metal, plastic or any other substrate related to bottling and packaging commonly known in the art and useful as containers.

The facestock may comprise paper facestock, plastic facestock, a multilayer laminated facestock including both paper and plastic layers, or any other materials that are commonly used in the industry.

The pressure sensitive construction of labels may have loop tack which is greater than about 8, greater than about 12, greater than about 16, and more particularly greater than about 20 newtons per inch (N/inch) when the facestock being used is paper, and when the pressure sensitive application being is performed on a glass substrate. The label may have loop tack which is greater than about 4, greater than about 8, and more particularly greater than 12 newtons per inch (N/inch) when the facestock is paper, and when the pressure sensitive application is performed on a high density polyethylene (HDPE) substrate. Generally, for many combinations of substrates and facestocks, the labels of the present subject matter exhibit loop tack values greater than about 2 and typically at least about 3 N/inch. However, it will be appreciated that the present subject matter is not limited to any of these particular loop tack ranges or values, and instead includes other loop tack values. Loop tack values as described herein are measured using Finat test method FTM-9 using a pull rate of 300 mm/min at room temperature.

The pressure sensitive construction of labels may exhibit a peel adhesion of at least 1 and in certain embodiments at least 2 N/inch after 24 hours bond time. In certain embodiments the labels exhibit a peel adhesion of at least 4, at least 6, at least 8, and in certain versions at least 10 N/inch. However, it will be understood that the present subject matter includes labels exhibiting a wide range of peel adhesion values and is not limited to these representative values. Peel adhesion 90° values are measured using Finat test method FTM-2 using a pull rate of 300 mm/min at room temperature.

In many embodiments, the coat weight of the opacifying adhesive is from about 5 to about 30 grams per square meter (gsm). According to certain embodiments herein, the opacifying adhesive layer can have a coat weight of from about 16 to about 40 grams per square meter (gsm). The opacifying adhesive layer may have a coat weight, more particularly from about 22 to about 30 grams per square meter (gsm).

Figure 2:
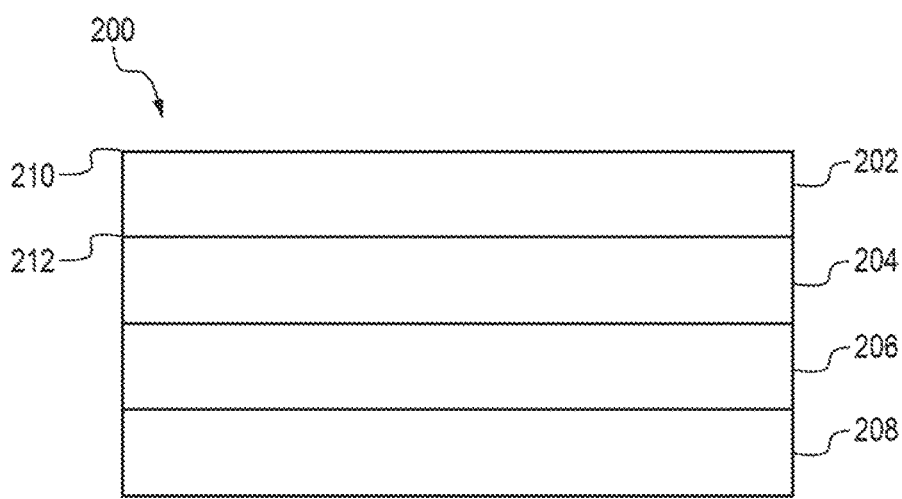
FIG. 2 is an illustrative embodiment of a cross-sectional view of a label having an opacifying adhesive layer and an adhesive layer in accordance with the present subject matter.

Another embodiment of pressure sensitive construction of a label laminate which is adapted to remain opaque in wet environment is shown in FIG. 2. The label laminate 200 includes an outer layer of facestock 202, an opacifying adhesive layer 204, an adhesive layer 206, and a liner 208. The face stock 202 has a first surface 210 and a second surface 212. The first surface 210 of the face stock is meant to receive indicia such as printed or others text or symbols. The opacifying adhesive layer 204 underlies the second surface 212 of the face stock 202. The adhesive layer 206 underlies the opacifying layer 204. The liner 208 underlies the adhesive layer 206.

The opacity of the label laminate 200 may be similar to the laminate 100 and the composition/content of the opacifying adhesive layer 204 may be similar to opacifying adhesive layer 104 according to an embodiment herein. In certain embodiments, the pigment component of the opacifying adhesive layer 204 can be more than 80% or more than 90% of the adhesive component.

The adhesive layer 206 may be selected from the group consisting of emulsion adhesives, hot-melt adhesives, solvent adhesives, and/or combinations thereof.

In a particular embodiment, the adhesive component may include acrylic adhesive.

The adhesive layer 206 may have a coat weight of about 8 to 20 gsm according to an embodiment herein.

In certain embodiments, the label 200 has loop tack which is greater than 8 newtons per inch (N/inch) when the facestock being used is paper, and when the pressure sensitive application is performed on a glass substrate. The label 200 may have loop tack which is greater than 4 newtons per inch (N/inch) when the facestock being used is paper, and when the pressure sensitive application is performed on a high density polyethylene (HDPE) substrate.

Figure 3:
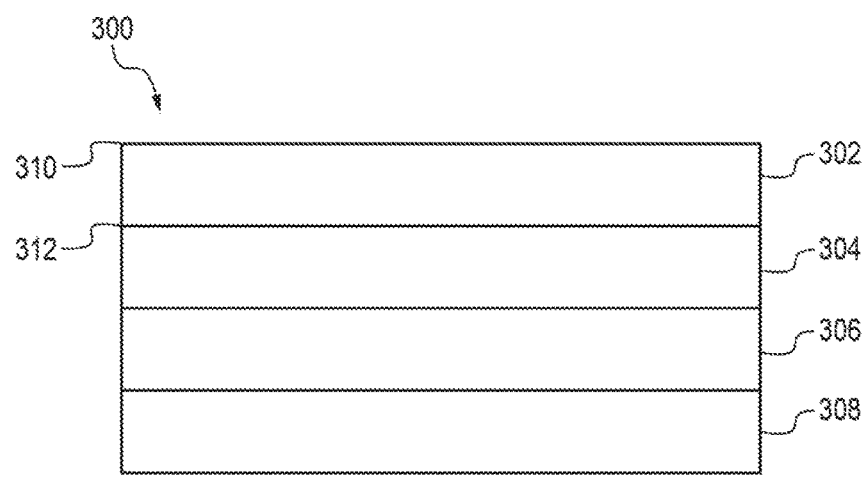
FIG. 3 is an illustrative embodiment of a cross-sectional view of a label having a first opacifying layer and second opacifying layer in accordance with the present subject matter.

Another embodiment of a pressure sensitive construction of a label laminate which is adapted to remain opaque in wet condition is shown in FIG. 3. The label laminate 300 includes an outer layer of facestock 302, a first opacifying adhesive layer 304, a second opacifying adhesive layer 306, and a liner 308. The first opacifying adhesive layer 304 underlies the facestock 302. The facestock 302 defines oppositely directed faces 310 and 312 as previously described. The liner 308 underlies the second opacifying adhesive layer 306. The first opacifying adhesive layer 304 includes a first adhesive component and a first pigment component in a proportion sufficient to maintain opacity when wet with no unacceptable loss of peel adhesion or loop tack of the first opacifying adhesive layer 304 in the pressure sensitive application. The second opacifying adhesive layer 306 includes a second adhesive component and a second pigment component in a proportion sufficient to maintain opacity when wet with no unacceptable loss of peel adhesion or loop tack of the second opacifying adhesive layer 306 in the pressure sensitive application.

The first adhesive component and the second adhesive component may be selected from the group consisting of emulsion adhesives, hot-melt adhesives, solvent adhesives, and/or combinations thereof.

The first pigment and the second pigment have an acceptable wet opacity.

The first pigment and the second pigment may include $TiO_2$ according to an embodiment herein.

In one embodiment, the first pigment component may be present in a weight range of about 10% to about 50% of the first adhesive component, in a weight range of about 15% to about 45% of the first adhesive component in another embodiment, and in weight range of from about 20% to about 40% of the first adhesive component in another embodiment. The second pigment component may be present in a weight range of from about 1% to about 10% of the second adhesive component.

The opacity of the label laminate 300 in wet condition may be about 80% to 100% and more particularly about 90%.

The first opacifying adhesive layer 304 may have coat weight of from about 13 grams per square meter (gsm) to about 25 grams per square meter (gsm) according to an embodiment herein.

The second opacifying adhesive layer 306 may have coat weight of about 6 grams per square meter (gsm) to about 20 grams per square meter (gsm) according to an embodiment herein.

The pressure sensitive application may be performed on a substrate that includes but is not limited to glass, plastic, metal or high density polyethylene (HDPE) or any other substrate and commonly known material substrate useful for containers.

The facestock 302 may include paper facestock, plastic facestock, multilayer laminate facestock include both paper and plastic layers, or any other face material known in the art. In certain embodiments, the multilayer laminate facestock may include a paper layer overlying a plastic layer. In some embodiments of the multilayer laminate, the plastic layer may be white or colorless, and in each condition may exhibit varying degrees of opacity. The plastic layer may be adhered to the paper by an adhesive. Alternatively, the plastic layer may be extruded or otherwise coated onto the paper layer. In the case of such multilayer laminate facestock, the opacity of the paper layer may reduce upon exposure to moisture or a liquid, while the opacity of the underlying plastic layer may not decrease upon exposure to moisture or liquid, or the change in opacity of the underlying plastic layer upon exposure to moisture or a liquid may be different than the change in opacity of the overlying paper layer subjected to the same moisture or liquid conditions. In such cases, the opacity change in the plastic layer may be less than the opacity change in the paper layer.

The pressure sensitive label laminate 300 exhibits loop tack which may be greater than 14 newtons per inch (N/inch) when the facestock being used is paper, and when the pressure sensitive application is performed on glass. In certain embodiments, the label exhibits a loop tack which is greater than 9 N/inch when the facestock is paper and the pressure sensitive application is performed on a high density polyethylene (HDPE) substrate. However, it will be understood that the present subject matter includes labels exhibiting a wide array of other loop tack values and is not limited to any of the values described herein.

In yet another aspect of the subject matter, an opacifying adhesive composition adapted to remain opaque in wet condition for pressure sensitive label application is provided. The opacifying adhesive is stable under aging conditions. The opacifying adhesive includes a proportionate amount of adhesive component and a pigment component sufficient to maintain opacity when wet while maintaining peel adhesion and loop tack in a pressure sensitive application.

The adhesive component may be selected from the group consisting of emulsion adhesives, hot-melt adhesives, solvent adhesives, and/or combinations thereof. The pigment component may be present in a weight range of about 10% to about 50% of the adhesive component in some embodiments, in weight range from about 15% to about 45% of the adhesive component in certain embodiments, and 20% to about 40% of the adhesive component in particular embodiments. The pigment may include $TiO_2$. The opacity of the label in wet condition may be in range of from about 70% to about 100% in many embodiments, from about 75% to about 95% in certain embodiments, and from about 80% to about 90% in particular embodiments. The pigment component may have higher proportion or concentration depending upon its use in conjunction with other adhesive layer(s) when used for maintaining opacity of the label in wet conditions.

The pressure sensitive application for the opacifying adhesive may be performed on substrates that include but are not limited to glass, plastic, metal, high density polyethylene (HDPE) substrate or any other substrate known in the art useful for containers.

Figure 4:
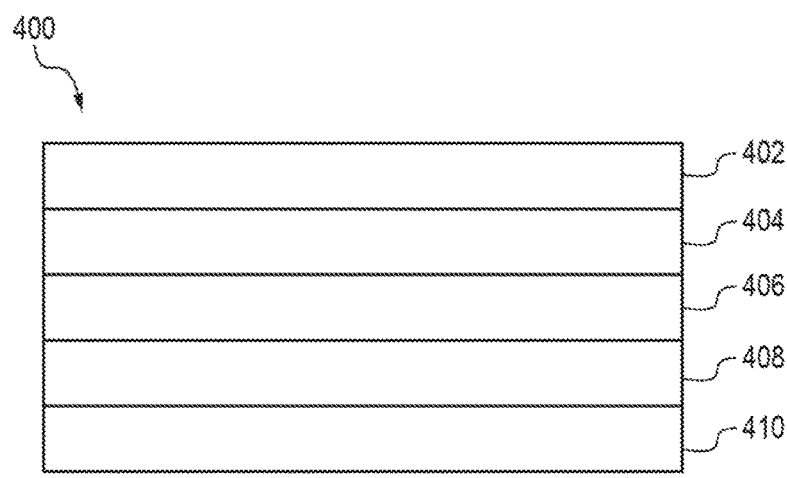
FIG. 4 is an illustrative embodiment of a cross-sectional view of a label having a filmic and/or metal layer in accordance with the present subject matter.

FIG. 4 illustrates another embodiment of a pressure sensitive construction of a label laminate 400 which is adapted to remain opaque in wet environment or condition. The label laminate 400 includes an outer layer of facestock 402, an opacifying adhesive layer 404, a clear or generally transparent layer or thin metallic layer 406, a pressure sensitive adhesive layer 408, and a liner 410. Details of these materials and/or layers are as previously described herein.

Figure 5:
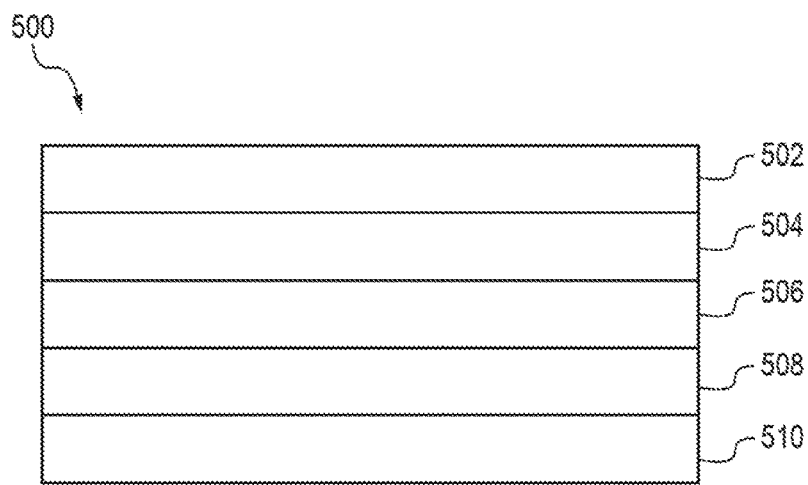
FIG. 5 is an illustrative embodiment of a cross-sectional view of a label having a clear or transparent film layer in accordance with the present subject matter.

FIG. 5 illustrates another embodiment of a pressure sensitive construction of a label laminate 500 which is adapted to remain opaque in wet environment or condition. The label laminate 500 includes an outer layer of facestock 502, a layer of a pressure sensitive adhesive or structural adhesive 504, a clear or generally transparent layer 506, an opacifying adhesive layer 508, and a liner 510. Details of these materials and/or layers are as previously described herein.

The present subject matter includes the incorporation of one or more clear or transparent layers in any of the label constructions described herein. The present subject matter also includes the incorporation of one or more metallic layers or metal foils in any of the label constructions described herein. It is also contemplated that the label constructions can also include combinations of one or more transparent layers and one or more metallic layers.

In a further embodiment of the subject matter, a method of preparation of an opacifying adhesive composition which is adapted to remain opaque in wet condition for pressure sensitive label application is provided. The method may include the steps of mixing a proportionate amount of an adhesive component and pigment component, and particularly with constant agitation, and continuing the mixing for about 20 minutes for an emulsion preparation for example. In many applications, mixing can be performed for a time period of from about 5 minutes to about 30 minutes. The opacifying adhesive thus obtained does not cause any unacceptable loss of peel adhesion or tack of the adhesive component in pressure sensitive application.

The adhesive component may include acrylic emulsion adhesive. The pigment component comprises Rutile grade aqueous $TiO_2$ slurry for example.

Figure 6:
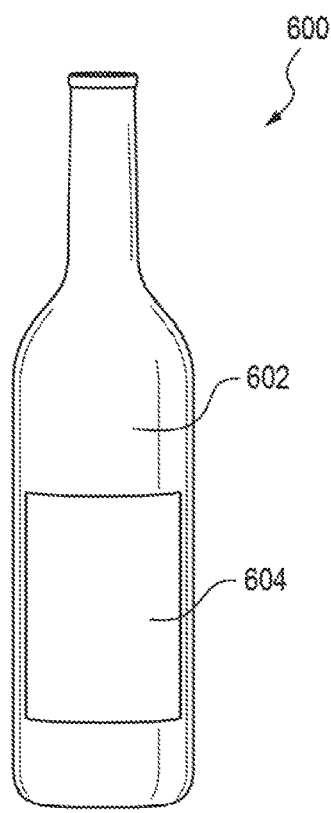
FIG. 6 is a schematic illustration of a labeled article such as a bottle in accordance with an embodiment of the present subject matter.

In yet another embodiment of the present subject matter, a labeled article is provided. The article includes one or more labels adhered to the article using any of the adhesives described herein and particularly the opacifying adhesives. The construction of the label may vary but is in many applications the same or similar to the labels depicted in FIGS. 1-5. FIG. 6 illustrates an example of a labeled article 600 such as a bottle 602 having a label 604 adhered thereto.

EXAMPLES

The following examples are provided to illustrate the subject matter and embodiments in greater detail without however limiting the scope thereto. In the examples all parts are, ratios or percentage by weight unless otherwise noted.

Selection of the Adhesive Component of the Opacifying Adhesive Layer

The following emulsion adhesives were taken as a starting material which includes:

1. S2000N: Acrylic emulsion commercially available from Avery Dennison
2. S692N: Acrylic emulsion commercially available from Avery Dennison
3. AT20N: Acrylic emulsion commercially available from Avery Dennison
4. H9232: Acrylic emulsion commercially available from BASF
5. XPE1045: Acrylic emulsion internally developed by Avery Dennison Selection of the Pigment Component of the Opacifying Adhesive Layer The following $TiO_2$ slurries were taken as a starting material which includes:

1. Siconyl K White 00-174547: 75-76% solid slurry of TiO2 commercially available from Audia International
2. Slurry A: TiO2 slurry containing 75-76% solids
3. Slurry B: TiO2 slurry containing 75-76% solids
4. Slurry C: TiO2 slurry containing 75-76% solids Preparation of Adhesive and $TiO_2$ Blend About 10% to 50% of Rutile grade aqueous $TiO_2$ slurry was added into the noted acrylic emulsion adhesives with constant agitation. The mixing was continued for an additional 20 minutes before being used for coating of layers in the label laminate.

Table 1 sets forth different opacifying adhesives (OA) based upon proportions of different adhesives and pigments component. Adhesives free of pigment were used as controls, i.e., "CTR-1, -2, -3, and -4."

TABLE 1

Summary of Controls and Opacifying Adhesive Compositions

| | | CTR-1 (%) | CTR-2 (%) | CTR-3 (%) | CTR-4 (%) | OA-1 (%) | OA-2 (%) | OA-3 (%) | OA-4 (%) | OA-5 (%) | OA-6 (%) | OA-7 (%) | OA-8 (%) | OA-9 (%) | OA-10 (%) | OA-11 (%) | OA-12 (%) |
|---|---|---|---|---|---|---|---|---|---|---|---|---|---|---|---|---|---|
| Adhesive | AT20N | 100 | | | | 80 | | | | | | | | | | | |
| | S2000N | | 100 | | | | 80 | | | 80 | | | | | | | |
| | S692N | | | 100 | | | | 80 | | | | | | | | | |
| | H9232 | | | | 100 | | | | 80 | | 80 | 85 | 95 | | | | |
| | XPE1045 | | | | | | | | | | | | | 100 | 85 | 85 | 85 |
| Pigment | Audia Siconyl K White 00174547 | | | | | 20 | 20% | 20 | 20 | | | | | | | 15 | |
| | Slurry B | | | | | | | | | 20 | 20 | 15 | 5 | | | | |
| | Slurry A | | | | | | | | | | | | | | 15 | | |
| | Slurry C | | | | | | | | | | | | | | | | 15 |

Single Layer Opacifying Adhesive Coating as Depicted in FIG. 1

Each of the adhesives as noted above was coated onto a siliconized polyester/paper liner at a coat weight of 23 grams per square meter (g/m2), and then transferred onto a paper face stock (Classic White UPM).

Coating of One or More Layers

Coating of one or more layer(s) of opacifying adhesive and/or adhesive layer as illustrated in different embodiments including embodiments of FIG. 2 and FIG. 3 can be performed by employing methods described in U.S. Pat. No. 5,962,075.

90° Peel Adhesion Test

The test samples prepared were subjected to a peel adhesion test at 90° using an Instron tensile tester on glass and high density polyethylene (HDPE) panels using a standard test protocol. Testing on the glass and HDPE panels was conducted at dwell times of 20 minutes and 24 hours. Test results are presented in Table 2 and Table 3.

Loop Tack Test

The test samples prepared as previously described were subjected to a loop tack test using an Instron tensile tester on glass and high density polyethylene (HDPE) panels using the standard test protocol. Test results are depicted in Table 2 and Table 3.

Opacity: Using Hunter Lab Spectrophotometer

The wet opacity of the paper laminate was measured by using a STD test method known to those in the art. The opacity was measured after two hours ice bucket immersion of samples applied onto standard BYK 2810 black-white opacity test cards. Results are listed in Table 2 and Table 3.

Representative loop tack performances of the labels with different opacifying adhesive formulations are shown in Table 2. In Table 2, "PT" refers paper tear.

Stability of the Opacifying Adhesives Under Aging Condition:

As described herein before, the opacifying adhesives maintain their stability under aging conditions and do not adversely affect the desired loop tack for PSA application. In Table 4 and Table 5, changes in loop tack values are tabulated which are measured under various aging conditions. Coat weight used was about 23 gsm for glass substrates. For Table 4, AVC 16699 base polymer available from Avery Dennison was utilized as a control whereas for Table 5, the base polymer was S692N which can be used as an adhesive component in the subject of the present subject matter. In all adhesives, pigment from Slurry A was added. In Tables 4 and 5, "RT" refers to room temperature. "Tropic" refers to a temperature of 40° C. and relative humidity of 95%.

TABLE 4

Stability of Control Adhesives

| Loop Tack-Substrate Glass | Condition | Only Adhesive (N/inch) | Adhesive Plus Pigment (Slurry A) (N/inch) | Remaining level of Loop tack compared to only adhesive |
|---|---|---|---|---|
| AVC 16699 | RT | 18.5 | 13.7 | 74.4% |
| AVC 16699 | 60° C. 1 week | 21.3 | 13.4 | 63.0% |
| AVC 16699 | Tropic 1 week | 17.9 | 13.5 | 75.1% |

TABLE 2

Representative Wet Opacity and Adhesive Properties of Labels of FIG. 1

| | Label Laminate of FIG. 1 | Loop Tack/ Glass (N/inch) | Loop Tack/ HDPE (N/inch) | Peel 90/ HDPE/Glass | Wet Opacity: Adhesive + Paper face (%) |
|---|---|---|---|---|---|
| Adhesive Only (No Pigment) | AT20N | 11.87 | 9.9 | PT | 71.73 |
| | S2000N | 20.47 | 13.3 | PT | 77.54 |
| | S692N | 16.53 | 11.67 | PT | 78.76 |
| | H9232 | 23.03 | 18.8 | PT | 69.7 |
| Opacifying Adhesives | Opacifying Adhesives-1 | 7.11 | 8.6 | PT | 90.06 |
| | Opacifying Adhesives-2 | 11.87 | 10.01 | PT | 91.2 |
| | Opacifying Adhesives-3 | 9.09 | 8.88 | PT | 91.75 |
| | Opacifying Adhesives-4 | 12.8 | 13.56 | PT | 88.28 |
| | Opacifying Adhesives-5 | 16.81 | 13.73 | PT | 90.66 |
| | Opacifying Adhesives-6 | 20.7 PT | 14.44 | PT | 88.68 |
| | Opacifying Adhesives-7 | 20.73PT | 12.73 | PT | 84.17 |

Representative loop tack performances of the labels with different opacifying adhesive layer and/or adhesive layer are shown in Table 3. In Table 3, "PT" refers paper tear.

TABLE 3

Representative Wet Opacity and Adhesive Properties of Labels of FIGS. 2 and 3

| Label Laminate Construction | Dual layer construction | Loop Tack/ Glass (N/inch) | Loop Tack/ HDPE (N/Inch) | Peel 90/ HDPE/Glass | Wet Opacity: Adhesive + Paper face (%) |
|---|---|---|---|---|---|
| Label laminate of FIG. 2 | Opacifying Adhesive Layer: Opacifying Adhesives-2 Adhesive Layer: CTR-2 | 14.8 | 9.48 | PT | 82% |
| Label laminate of FIG. 3 | First Opacifying Adhesive Layer: Opacifying Adhesives-7 Second Opacifying Adhesive Layer: Opacifying Adhesives-8 | PT | 15 | PT | 83% |

TABLE 5

Stability of Opacifying Adhesives

| Loop Tack-Substrate Glass | Condition | Only Adhesive (N/inch) | Adhesive Plus Pigment (Slurry A) (N/inch) | Remaining level of Loop tack compared to only adhesive |
|---|---|---|---|---|
| S692N | RT | 13.4 | 10.1 | 75.0% |
| S692N | 60° C. 1 week | 14.2 | 10.7 | 75.6% |
| S692N | Tropic 1 week | 13.5 | 10.8 | 80.2% |

A comparison of loop tack values reported in Table 4 and Table 5 suggests that the present subject matter opacifying adhesives have almost nil impact on aging and thus are stable.

Additional evaluations were performed to assess peel adhesion and loop-tack of opacifying adhesives after wetting.

TABLE 6

Formulations and Opacity after Two Hours in Ice Bucket

| | | OA-9 | OA-10 | OA-11 | OA-12 |
|---|---|---|---|---|---|
| Adhesive | XPE1045 | 100 | 85 | 85 | 85 |
| Pigment | Slurry A | | 15 | | |
| | Siconyl K White 00-174547 | | | 15 | |
| | Slurry C | | | | 15 |
| | Opacity (%) | 58.78 | 84.03 | 83.20 | 83.80 |

XPE1045 is an acrylic emulsion adhesive internally developed by Avery Dennison. Face material used for the opacity measurement was Classic White paper UPM China.

Table 7 shows the impact of white pigment on the loop tack.

To exclude the impact of the face paper, a clear polypropylene film (PP60 available from Avery Dennison) was used. During aging tests materials from a paper face might migrate into the adhesive, which could have a negative impact. To exclude the possible effect of the face paper, a filmic polypropylene face was utilized. "RT" and "Tropic" have the same meanings as previously noted.

TABLE 7

Effect of White Pigment on Loop Tack

| | | OA-9 | OA-10 |
|---|---|---|---|
| Adhesive | XPE1045 | 100 | 85 |
| Pigment | Slurry A | | 15 |
| | Loop Tack Glass RT aged (N/inch) | 13.2 | 10.8 |
| | % left of clear adhesive | | 81.8% |
| | Loop Tack Glass 60° C. aged (N/inch) | 12.7 | 10.43 |
| | % left of clear adhesive | | 82.1% |
| | Loop Tack Glass tropic aged (N/inch) | 13.67 | 9.95 |
| | % left of clear adhesive | | 72.8% |
| | Loop Tack HDPE RT aged (N/inch) | 5.35 | 4.5 |
| | % left of clear adhesive | | 84.1% |
| | Loop Tack HDPE 60° C. aged (N/inch) | 6.13 | 6.64 |
| | % left of clear adhesive | | 108.3% |
| | Loop Tack HDPE tropic aged (N/inch) | 6.86 | 5.17 |
| | % left of clear adhesive | | 75.4% |

The use of different grades of $TiO_2$ was also investigated. The tested $TiO_2$ types differed in type, stabilization compound, percentage $TiO_2$ and oil absorption.

TABLE 8

Chemical and Physical Characteristics of the Different Grades of $TiO_2$

| Supplier & Grade | Type | Stabilized with compounds of these elements | $TiO_2$ content (wt % min.) | Density (g/cm3) | Oil absorption (ISO 787/5) |
|---|---|---|---|---|---|
| Kronos 2044 | Rutile | Al, Si | 82 | 3.6 | 41 |
| Kronos 1002 | Anatase | — | 99 | 3.7 | 19 |
| Dupont R-706 | Rutile | Al, Si | 93 | 4 | 13.9 |

In this evaluation, the slurry was prepared by blending the noted $TiO_2$ powder with water under stirring. No additives such as dispersants were added. The prepared slurry was added to the adhesive under mixing.

Table 9 shows the formulations and loop tack results. Face material was polypropylene. No paper was used to exclude potential interaction with agents/components migrating out of the paper into the adhesive. The adhesive and pigments used are those described in conjunction with Tables 7 and 8. In Table 9, "RT" and "Tropic" have the same meanings as previously noted.

TABLE 9

Loop Tack Results

| | | OA-13 | OA-14 | OA-15 |
|---|---|---|---|---|
| Adhesive | XPE1045 | 85 | 85 | 85 |
| Pigment | K1002 | 15 | | |
| | K2044 | | 15 | |
| | R706 | | | 15 |
| | Loop Tack Glass RT aged (N/inch) | 8.1 | 8.3 | 8.3 |
| | Loop Tack Glass 60° C. aged (N/inch) | 9.1 | 9.4 | 9.7 |
| | Loop Tack Glass tropic aged (N/inch) | 9.5 | 9.7 | 10.6 |
| | Loop Tack HDPE RT aged (N/inch) | 6.2 | 6.1 | 7.3 |
| | Loop Tack HDPE 60° C. aged (N/inch) | 6.3 | 6.0 | 7.2 |
| | Loop Tack HDPE tropic aged (N/inch) | 6.1 | 5.9 | 7.7 |
| | Opacity, see Table 10 | — | — | — |

Table 9 shows there is substantially no difference in loop tack between the tested $TiO_2$ grades. These results demonstrate new and unexpected properties because it would be expected that uncoated $TiO_2$ and $TiO_2$ with a high oil absorption would have a negative impact on adhesive stability. Also the wet adhesive was stable and easy to coat using slot die techniques.

In still additional evaluations, the effect of coating paper with opacifying adhesive upon dry opacity and wet opacity was investigated. The paper used was Centaure Blanc from Arjo Wiggins. As shown below in Table 10, when the paper is dry the opacity improvement because of the white adhesive is only 3 to 4.4 (delta opacity dry). When the paper is wet then this difference is 13 to 20. This clearly shows the benefit of the white adhesive under wet conditions (delta opacity wet).

TABLE 10

Effects on Dry and Wet Opacity

|  |  | Dry Opacity | | | Wet Opacity | | |
|---|---|---|---|---|---|---|---|
|  |  | OA-13 | OA-14 | OA-15 | OA-13 | OA-14 | OA-15 |
| Adhesive | XPE1045 | 85 | 85 | 85 | 85 | 85 | 85 |
| Pigment | K1002 | 15 | | | 15 | | |
|  | K2044 | | 15 | | | 15 | |
|  | R706 | | | 15 | | | 15 |
|  | Opacity of paper with opaque adhesive (%) | 93.8 | 94.5 | 95.2 | 78.3 | 79.4 | 85.5 |
|  | Opacity of dry paper (no adhesive) (%) | 90.8 | 90.8 | 90.8 | | | |
|  | Opacity of wet paper (no adhesive) (%) | | | | 65.3 | 65.3 | 65.3 |
|  | Delta opacity dry = dry paper + opaque adhesive opacity − dry paper opacity | 3.0 | 3.7 | 4.4 | | | |
|  | Delta opacity wet = wet paper + opaque adhesive opacity − wet paper opacity | | | | 13.0 | 14.1 | 20.2 |

In yet another series of evaluations, peel adhesion was investigated. Table 11 summarizes peel adhesion values measured for samples using an opacifying adhesive including S692N and Slurry A as pigment. The samples were prepared using clear polypropylene film PP60.

TABLE 11

Peel Adhesion

|  | Peel Adhesion Bond Time = 24 h | OA-16 | OA-17 |
|---|---|---|---|
| Adhesive | 5692N | 100 | 85 |
| Pigment | Pigment Slurry - A | | 15 |
|  | Peel Adhesion 90 Glass RT aged | 13.5 | 10.8 |
|  | % left of clear adhesive | | 80.0% |
|  | Peel Adhesion 90 Glass 60 C. aged | 6.8 | 6.1 |
|  | % left of clear adhesive | | 90.0% |
|  | Peel Adhesion 90 Glass tropic aged | 6.0 | 5.0 |
|  | % left of clear adhesive | | 83.3% |
|  | Peel Adhesion 90 HDPE RT aged | 6.0 | 4.5 |
|  | % left of clear adhesive | | 75.0% |
|  | Peel Adhesion 90 HDPE 60 C. aged | 4.7 | 4.5 |
|  | % left of clear adhesive | | 94.7% |
|  | Peel Adhesion 90 HDPE tropic aged | 4.0 | 3.1 |
|  | % left of clear adhesive | | 77.5% |

Table 12 summarizes peel adhesion values measured for samples using an opacifying adhesive including XPE1045 and Slurry A as pigment. The samples were prepared using clear polypropylene film PP60.

TABLE 12

Peel Adhesion

|  | Peel Adhesion Bond Time = 24 h | OA-9 | OA-10 |
|---|---|---|---|
| Adhesive | XPE1045 | 100 | 85 |
| Pigment | Slurry A | | 15 |
|  | Peel Adhesion 90 Glass RT aged | 17.9 | 13.5 |
|  | % left of clear adhesive | | 75.4% |
|  | Peel Adhesion 90 Glass 60 C. aged | 11.3 | 6.9 |
|  | % left of clear adhesive | | 61.1% |
|  | Peel Adhesion 90 Glass tropic aged | 10.6 | 6.2 |
|  | % left of clear adhesive | | 58.5% |
|  | Peel Adhesion 90 HDPE RT aged | 9.8 | 7.1 |
|  | % left of clear adhesive | | 72.4% |
|  | Peel Adhesion 90 HDPE 60 C. aged | 6.6 | 5.8 |
|  | % left of clear adhesive | | 87.9% |
|  | Peel Adhesion 90 HDPE tropic aged | 5.3 | 3.99 |
|  | % left of clear adhesive | | 75.3% |

It will be understood that an opacity range of 80% to 90% may also encompass opacity of more than 80% or 90% for visible light or similar wavelength(s).

Thus, specific compositions and embodiments of the opaque adhesive composition or the label laminate have been disclosed. It should be apparent, however, to those skilled in the art that many more modifications besides those already described are possible without departing from the aspects described herein. The present subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A label adapted to remain opaque in wet condition, said label comprising:
   an outer layer of facestock for receiving printed indicia;
   at least one opacifying adhesive layer underlying said facestock,
      wherein said opacifying adhesive layer comprises an adhesive component and a pigment component in proportion sufficient to maintain opacity when exposed to an aqueous environment and a peel adhesion of at least 1 N/inch and a loop tack of at least 2 N/inch of the opacifying adhesive layer in a pressure sensitive application, and wherein said pigment component comprises surface coated $TiO_2$ and wherein said pigment component is present in a weight range of about 10% to about 50% of said adhesive component; and a liner, underlying said opacifying adhesive layer.

2. The label of claim 1, wherein said adhesive component is a pressure sensitive adhesive.

3. The label of claim 1, wherein said adhesive component is selected from the group consisting of emulsion adhesives, hot-melt adhesives, solvent adhesives, and combinations thereof.

4. The label of claim 1, wherein said pigment component has a wet opacity greater than 70%.

5. The label of claim 1, wherein said label further comprises a second adhesive layer underlying said opacifying adhesive layer.

6. The label of claim 5, wherein said second adhesive layer is selected from the group consisting of emulsion adhesives, hot-melt adhesives, solvent adhesives, and combinations thereof.

7. The label of claim 5, wherein the loop tack of the label is at least 3 newtons per inch (N/inch) when said facestock is paper, and when said pressure sensitive application is performed on a glass substrate.

8. The label of claim 5, wherein the loop tack of the label is at least 2 newtons per inch (N/inch) when said facestock is paper, and when said pressure sensitive application is performed on a high density polyethylene (HDPE) substrate.

9. The label of claim 1, wherein said adhesive component includes acrylic adhesive.

10. The label of claim 1, wherein said opacity in wet condition is about 80% to 90%.

11. The label of claim 1, wherein said pressure sensitive application is performed on a substrate comprising glass.

12. The label of claim 1, wherein said pressure sensitive application is performed on a high density polyethylene (HDPE) substrate.

13. The label of claim 1, wherein said facestock comprises a paper facestock.

14. The label of claim 1, wherein said facestock comprises a plastic facestock.

15. The label of claim 1, wherein said loop tack is at least 3 newtons per inch (N/inch) when said facestock is paper, and when said pressure sensitive application is performed on a glass substrate.

16. The label of claim 1, wherein said loop tack is at least 2 newtons per inch (N/inch) when said facestock is paper, and when said pressure sensitive application is performed on a high density polyethylene (HDPE) substrate.

17. The label of claim 1, wherein said opacifying adhesive layer has a coat weight of about 16 to about 30 grams per square meter (gsm).

18. The label of claim 1, wherein said opacifying adhesive layer has a coat weight, of about 22 to about 26 grams per square meter (gsm).

19. The label of claim 1 further comprising:
a clear or transparent layer.

20. The label of claim 1 further comprising:
a metallic layer.

* * * * *